Dec. 16, 1941.  T. A. WETTIG  2,266,695
TOOL HOLDER
Filed June 8, 1940  2 Sheets-Sheet 1

Dec. 16, 1941.  T. A. WETTIG  2,266,695
TOOL HOLDER
Filed June 8, 1940  2 Sheets-Sheet 2

INVENTOR.
Theodore A. Wettig
BY
Oliver B. Kaiser
ATTORNEY

Patented Dec. 16, 1941

2,266,695

UNITED STATES PATENT OFFICE 2,266,695

TOOL HOLDER

Theodore A. Wettig, Cincinnati, Ohio, assignor to The Acme Machine Tool Company, Cincinnati, Ohio, a corporation of Ohio Application June 8, 1940, Serial No. 339,506

6 Claims. (Cl. 29—57)

This invention relates to improvements in multiple or plural tool holders adapted primarily for mounting upon a turret of a machine tool.

An object of the invention is to provide a multiple tool holder for application upon a turret of a machine tool with diversified tool mountings in compact grouping respectively micrometrically adjustable, nonadjustable, or in a fixed location, and transposable or readily displaceable.

Various other features and advantages of the invention will be more fully apparent from a description of the accompanying drawings, in which:

Figure 5 is a section taken on line 5—5, Figure 1, illustrating the adjustable tool holder socket.

Figure 6 is a section taken on line 6—6, Figure 1, further illustrating the same.

Figure 1:
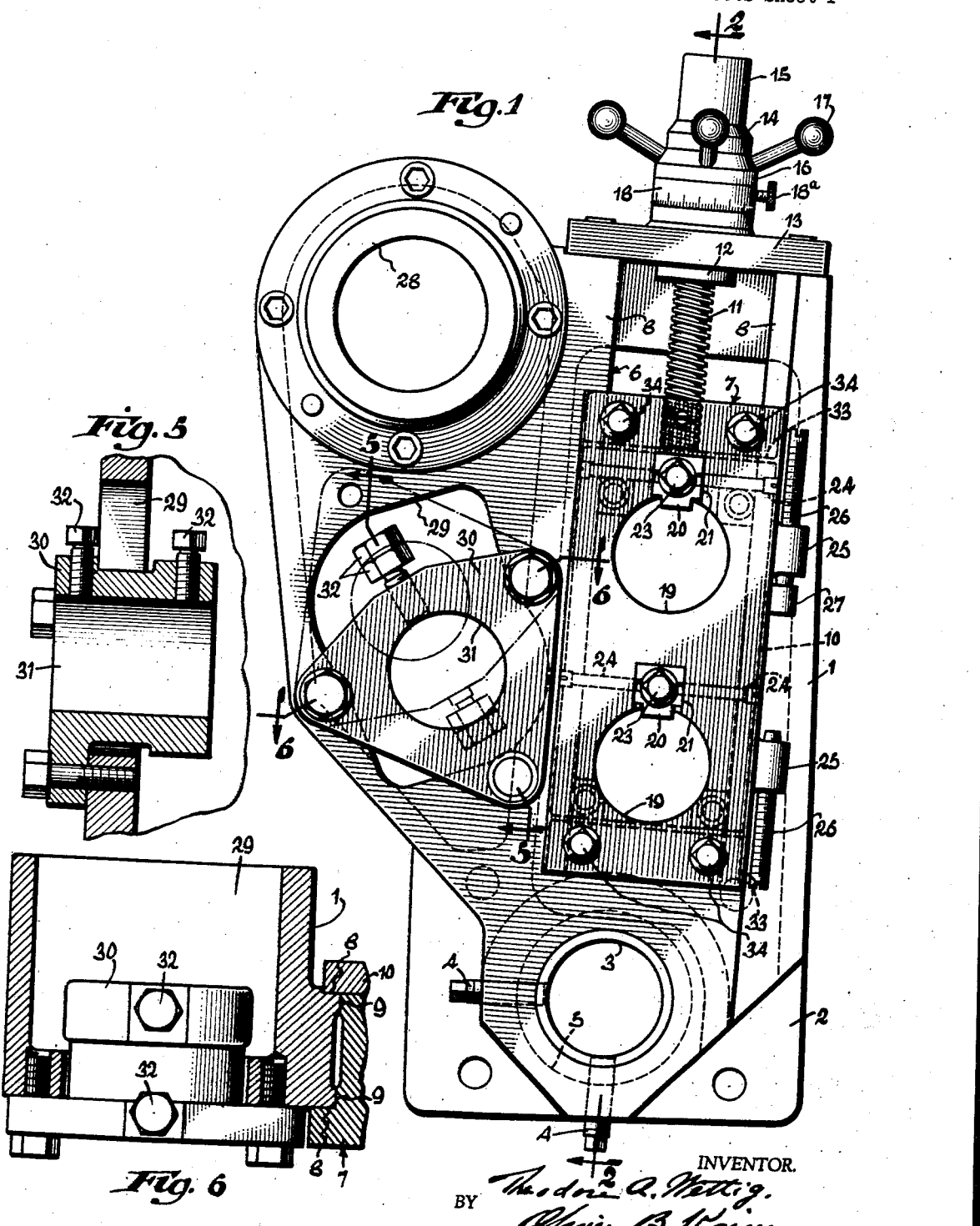
Figure 1 is a front elevation of the tool holder fixture with the tool slide adjusted to its lowermost position.

Referring to the drawings, the tool holder comprises a body 1 as a bracket, having a flange 2 at its rear side and lower end for attaching the body to the face of a turret of a machine tool, sustaining the body in a vertical position. The lower end of the body, centrally thereof, has a bushed opening 3 therethrough, for receiving and mounting a tool or tool holder with the shank thereof secured in place by set-screws 4. The opening at the rear side of the body is in registry with an opening through a face wall of the turret of the machine tool or support to which the holder is applied.

Figure 2:
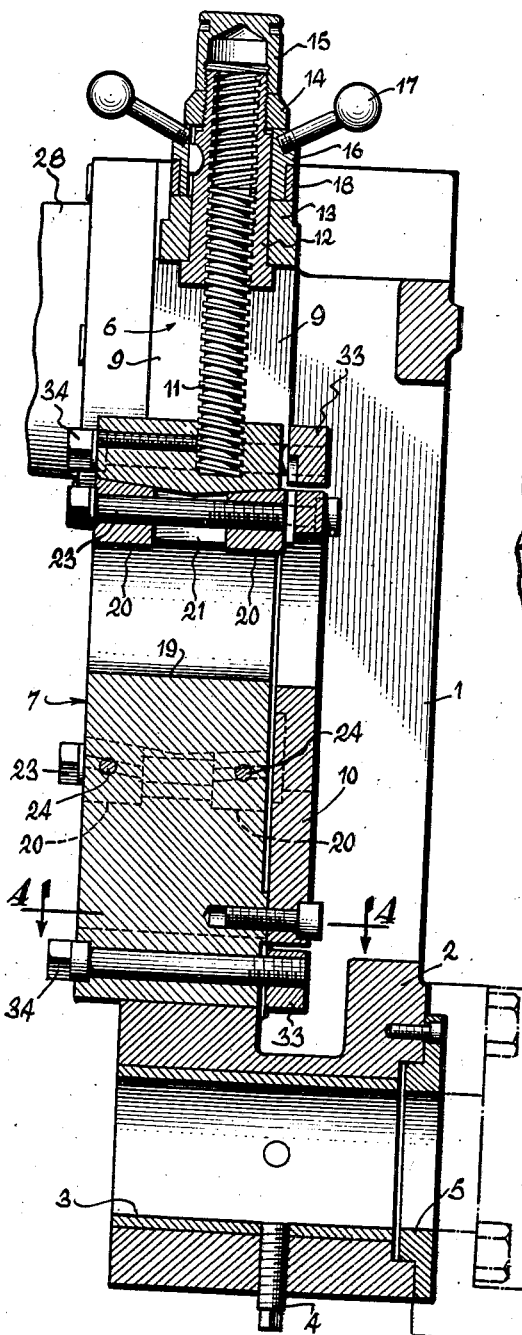
Figure 2 is a sectional view of the same, taken on line 2—2, Figure 1.
Figure 3:
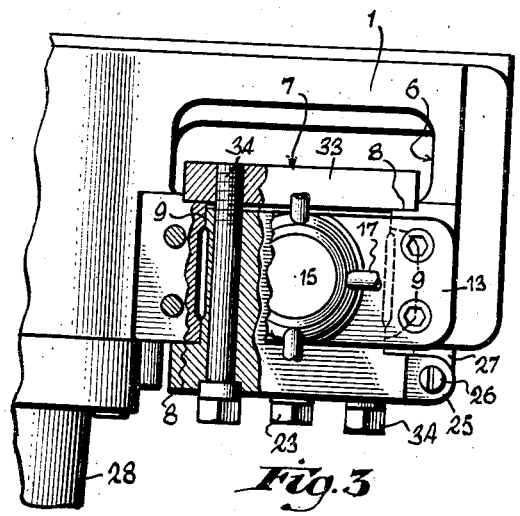
Figure 3 is a fragmentary top plan view of the fixture with a portion broken away to illustrate the slide structure.

A counterturned collar 5, shown in Figure 2, as a hub extension, is fixed to the rear side of the body having its front reduced diameter portion recessed within the body, and the rear protruding portion engaged within an opening in the face wall of the turret. The collar may be formed integral with the body, and provides a convenient means for seating the body upon the face wall of the turret to assist in stabilizing the same thereon.

Figure 4:
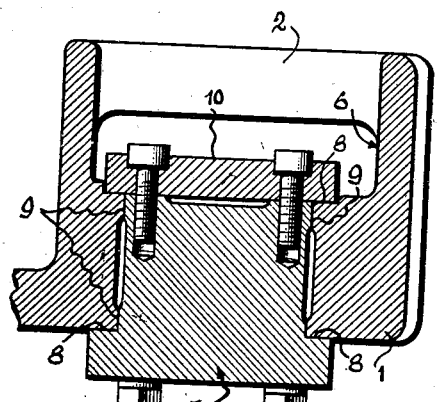
Figure 4 is a cross section taken on line 4—4, Figure 2.

The body of the holder above the lower turret attaching end portion has a longitudinal opening 6 therethrough to provide a guideway for a tool carrying slide 7. The opening, as shown in Figure 4, provides parallel opposing guide rails 8, 8, for slidably supporting the slide 7. Each rail has its face side longitudinally recessed, producing a pair of spaced right angled bearing surfaces 9, 9, with which the slide contacts.

The slide has a flange projected from each of its opposite sides, bearing against the front bearing surfaces of the rails, and at its rear end has a plate 10 fixed thereto and in bearing contact with the rear bearing surfaces of the rails to secure the slide to the rails or body. The slide at its upper end connects with an end of a screw 11 extending or depending from and in threaded engagement with a sleeve nut 12 journalled within a supporting or cross plate 13 fixed to the body at the upper ends of the rails and spanning the opening 6 in the body.

The lower end of the sleeve nut is flanged to provide a shouldered engagement with the cross plate 13, and its opposite end is of reduced diameter and threaded to receive a lock ring 14 and a cap 15. The sleeve nut 12 has a hand wheel fixed thereto, composed of a collar 16 keyed to the sleeve and interposed between the cross plate 13 and lock ring 14 provided with a plurality of handles 17 extending angularly therefrom for manually rotating the sleeve nut to translate or adjust the slide. The collar 16 of the hand wheel has a gauge or dial ring 18 recessed therein, the periphery of the ring bearing suitable graduations and indicia for indicating the degree of slide adjustment or regulation. The gauge or dial ring is locked or fixed to the collar 16 of the hand wheel by a set-screw 18$^a$. The feed mechanism of the slide, above described, is of conventional type.

The slide is provided with a pair of tool or tool holder receiving openings 19, 19, centrally longitudinally thereof, each of which is provided with a pair of oppositely disposed clamping members 20, 20, slidable within a groove 21 in the slide longitudinal with the axis of the opening. The base of the groove has oppositely inclined surfaces cooperating respectively each with a relatively inclined surface on the upper or outer side of a clamping member 20. The clamping or wedge members 20 are connected by a screw 23, traversing one of the members and in threaded engagement with the other for drawing the same together to wedge between the base of the groove and tool disposed within the opening 19. The opposite sides of each of the clamping members are longitudinally grooved, each groove to receive the end of a respective screw 24 to sustain the member within the groove 21.

The slide at one side has a pair of lugs 25, 25, extending from the face flange thereof, each sustaining a screw 26 adapted to contact with a stop lug 27 projected from the face side of the body between the lugs 25 of the slide. The stop screws 26 serve to limit the adjustment of the slide in its opposite directions of feeding motion.

The body at its upper end adjacent the tool holding slide has an opening therethrough registering with the opening of a flange collar 28 fixed to the front side of the body for receiving and extending a pilot bar therethrough projecting from the head-stock of the lathe.

The body between the pilot bar collar 28 and tool receiving opening 3 has an aperture 29 therethrough which is partially covered by a tool holding block 30, preferably having a head portion of approximately triangular outline supported at three points to the front face side of the body. The tool holding block 30 has an opening 31 therethrough to receive a tool or tool holder, which is clamped to the block by a pair of setscrews 32. The tool block is therefore located adjacent to the slide in an intermediate position and adaptable to be transposed to either of two or a plurality of positions, a second position of the block being indicated by dotted lines in Figure 1.

In the present instance, the tool holder as a unit provides for holding four tools and a pilot bar, with two mounted on the slide movable by the feed screw, a third transposable to change its elevation, while the fourth is in a non-adjustable or fixed location. A plurality of tools thus can be relatively compactly arranged upon the holder, and may be either of the same or different character as for boring, reaming, facing, or other metal cutting operations, of particular advantage in machining work, as bottle molds, in which the machining must be done with the various types of tools as well as permitting several tools to be active at the same time.

While the tool holding slide normally is adjustable, provision is also made for immovably clamping the slide to the body in any adjustable or set position. This is accomplished by a pair of clamp plates or bars 33 relatively disposed at opposite top and bottom ends of the slide or gib plate 10 of the slide. Each slide clamp bar 33 is in threaded connection with a pair of screws 34 traversing the slide with the head end of the screws accessible from and bearing against the front face of the slide, whereupon upon tightening the screws, the clamp bars are brought into binding engagement with the slide rails, rigidly clamping the slide thereto.

The slide having provision for mounting a pair of tools, after an appropriate setting of the stop screws 26 is made the tools can be readily alternately brought to a proper working location by a movement of the slide in an appropriate direction to bring either of the screws into contact with the stationary stop lug 27; after which, if required, the slide can be rigidly clamped to the body or bracket by tightening the bolts 34. Likewise, the tools can be readily adjusted away from the work to clear the same for loading or unloading, and quickly brought to a correct position for a second piece of work.

Having described my invention, I claim:

1. A tool holder, comprising: a body having an end formed for application to a turret of a machine tool, sustaining the body thereon in a perpendicularly projected position, the attaching end of the body having an opening centrally thereof for receiving a tool or tool holder, the body above its turret attaching end portion having a slideway for a tool carrying slide, a slide mounted within said slideway having a plurality of relatively aligned openings longitudinally of the slide, each for receiving a tool or tool holder, screw means carried by the body and connecting with the slide for moving the slide, means for clamping the slide rigidly to the body, adjustable means for limiting the movement of the slide, and a displaceable tool holder adapted to be mounted on the body at one side of the slide at one of several selected positions.

2. A tool holder, comprising, a body having an end formed for application to a turret of a machine tool, sustaining the body thereon in a perpendicularly projected position, a portion of the body above its turret attaching end portion having a slideway for a tool carrying slide, and a second portion adjacent one side of the slideway for supporting a plurality of tool holders at relatively different elevations, a slide mounted within said slideway having a plurality of aligned openings, each for receiving a tool or tool holder, screw means carried by said body at the upper end thereof and connecting with the slide for moving said slide, a pair of stop screws mounted upon and projecting from one side of the slide, a stop lug extending from the body intermediate of the opposing ends of said stop screws for limiting the movement of the slide in either of its reverse directions of movement, and a pair of tool holding fixtures mounted upon said body portion adjacent the slide, one thereof secured in a fixed position upon the body, and the second transposable to one of several locations.

3. A tool holder, comprising, a body having an end formed for application to a turret of a machine tool, sustaining the body thereon in a perpendicularly projected position, a portion of the body above its turret attaching end portion having a slideway for a tool carrying slide, and a second portion adjacent one side of the slideway for supporting a plurality of tool holders at relatively different elevations, a slide mounted within said slideway having a plurality of aligned openings, each for receiving a tool or tool holder, screw means carried by said body at the upper end thereof and connecting with the slide for moving said slide, a pair of stop screws mounted upon and projecting from one side of the slide, a stop lug extending from the body intermediate of the opposing ends of said stop screws for limiting the movement of the slide in either of its reverse directions of movement, a pair of clamp bars carried by said slide respectively at relative opposite ends thereof for clamping the slide rigidly to the body, and a pair of tool holding fixtures mounted upon said body portion adjacent the slide, one thereof secured in a fixed position upon the body, and the second transposable to one of several locations.

4. A tool holder, comprising: a body having an end formed for application to the turret of a machine tool, sustaining the body thereon in a perpendicularly projected position, a portion of the body above its turret attaching end having a slideway for a tool carrying slide, the slide having a plurality of relatively aligned openings longitudinally thereof, each for receiving a tool or tool holder, means for adjusting the slide relative to the body, adjustable means for limiting the movement of the slide, a tool holding fixture having a flange for mounting on the body adjacent the slide and spanning an opening through the body, and providing a tool receiving socket disposed within the opening in the body, the holding fixture transferably mounted for altering its tool location relative to the slide.

5. A tool holder, comprising: a body having an end formed for application to the turret of a machine tool, sustaining the body thereon in a perpendicularly projected position, a portion of the body above its turret attaching end having a slideway for a tool carrying slide, the slide having a plurality of relatively aligned openings longitudinally thereof, each for receiving a tool or tool holder, means for adjusting the slide relative to the body, adjustable means for limiting the movement of the slide, a tool holding fixture having a flange for mounting on the body adjacent the slide and spanning an opening through the body, and providing a tool receiving socket disposed within the opening in the body, the flange of the holding fixture providing for mounting the fixture at three points on the body and transposable in either of two selected positions by a partial rotation of the fixture.

6. A tool holder, comprising: a body having an end formed for application to the turret of a machine tool, sustaining the body thereon in a perpendicularly projected position, the attaching end of the body having an opening centrally thereof for receiving a tool or tool holder, the body above its turret attaching end portion having a slideway for a tool carrying slide, a slide mounted within said slideway having a plurality of relatively aligned openings longitudinally thereof, each for receiving a tool or tool holder, screw means carried by the body and connecting with the slide for shifting the slide and tools carried thereby in a line radial to the center of said tool opening at the attaching end of the body, adjustable means for limiting the movement of the slide, a tool holding fixture mounted on a portion of the body adjacent the slide, the fixture having an attaching flange external of the body for attachment thereto and including a tool receiving socket disposed within an opening in the body, the flange providing for a transposable two-position attachment of the fixture for transposing the fixture and tools carried thereby in a line radial to the center of the tool opening at the attaching end of the holder in either of two positions.

THEODORE A. WETTIG.